(12) United States Patent
Sreenivasamurthy et al.

(10) Patent No.: US 10,162,827 B2
(45) Date of Patent: Dec. 25, 2018

(54) METHOD AND SYSTEM FOR DISTRIBUTED CONTROL SYSTEM (DCS) PROCESS DATA CLONING AND MIGRATION THROUGH SECURED FILE SYSTEM

(71) Applicant: Honeywell International Inc., Morristown, NJ (US)

(72) Inventors: Shreehari Sreenivasamurthy, Bangalore (IN); Sanoopkrishnan Sunil, Ernakulam (IN)

(73) Assignee: Honeywell International Inc., Morris Plains, NJ (US)

( * ) Notice: Subject to any disclaimer, the term of this patent is extended or adjusted under 35 U.S.C. 154(b) by 343 days.

(21) Appl. No.: 14/681,536

(22) Filed: Apr. 8, 2015

(65) Prior Publication Data

US 2016/0299909 A1 Oct. 13, 2016

(51) Int. Cl.

| | |
|---|---|
| *G06F 7/02* | (2006.01) |
| *G06F 17/30* | (2006.01) |
| *G06F 8/65* | (2018.01) |
| *G06F 11/14* | (2006.01) |
| *G06F 9/445* | (2018.01) |
| *G05B 19/418* | (2006.01) |

(52) U.S. Cl.
CPC . *G06F 17/30079* (2013.01); *G05B 19/41845* (2013.01); *G06F 8/65* (2013.01); *G06F 9/44505* (2013.01); *G06F 11/1469* (2013.01); *G06F 2201/80* (2013.01); *Y02P 90/16* (2015.11)

(58) Field of Classification Search
CPC ..... G06F 8/65; G06F 8/61; G06F 8/71; G06F 17/30575; G06F 8/60; G06F 9/44505; G06F 17/30079; G06F 17/30
See application file for complete search history.

(56) References Cited

U.S. PATENT DOCUMENTS

| | | |
|---|---|---|
| 4,679,189 A | 7/1987 | Olson et al. |
| 5,537,414 A | 7/1996 | Takiyasu et al. |

(Continued)

FOREIGN PATENT DOCUMENTS

| | | |
|---|---|---|
| CN | 101819545 | 9/2010 |
| CN | 103605561 | 2/2014 |

(Continued)

OTHER PUBLICATIONS

Extended European Search Report dated Aug. 9, 2016 in connection with European Application No. 16163463.9, 9 pages.

(Continued)

*Primary Examiner* — Bruce M Moser (57) ABSTRACT

A method includes generating a migration image file for a software migration based on configuration parameters associated with a first node of an industrial process control and automation system. The method also includes, after a new software version is installed at the first node, restoring information associated with the first node using the migration image file. The method further includes adapting a portion of the migration image file based on configuration parameters associated with a second node of the control and automation system. In addition, the method includes, after the new software version is installed at the second node, restoring information associated with the second node using the adapted migration image file.

20 Claims, 5 Drawing Sheets

(56) References Cited

U.S. PATENT DOCUMENTS

| | | |
|---|---|---|
| 5,566,356 A | 10/1996 | Taketsugu |
| 5,664,195 A | 9/1997 | Chatterji |
| 5,749,053 A | 5/1998 | Kusaki et al. |
| 5,898,826 A | 4/1999 | Pierce et al. |
| 6,141,769 A | 10/2000 | Petivan et al. |
| 6,192,232 B1 | 2/2001 | Iseyama |
| 6,256,297 B1 | 7/2001 | Haferbeck et al. |
| 6,292,905 B1 | 9/2001 | Wallach et al. |
| 6,374,352 B1 | 4/2002 | Goldman et al. |
| 6,427,071 B1 | 7/2002 | Adams et al. |
| 6,437,692 B1 | 8/2002 | Petite et al. |
| 6,631,416 B2 | 10/2003 | Bendinelli et al. |
| 6,694,447 B1 | 2/2004 | Leach et al. |
| 6,701,453 B2 | 3/2004 | Chrabaszcz |
| 6,751,219 B1 | 6/2004 | Lipp et al. |
| 6,763,458 B1* | 7/2004 | Watanabe ............ G06F 9/441 |
| | | 713/100 |
| 6,847,316 B1 | 1/2005 | Keller |
| 6,850,486 B2 | 2/2005 | Saleh et al. |
| 6,917,584 B2 | 7/2005 | Kuwabara |
| 6,963,781 B2 | 11/2005 | Fehrer et al. |
| 7,031,308 B2 | 4/2006 | Garcia-Luna-Aceves et al. |
| 7,035,937 B2 | 4/2006 | Haas et al. |
| 7,058,848 B2 | 6/2006 | Sicola et al. |
| 7,190,961 B2 | 3/2007 | Burr |
| 7,203,743 B2 | 4/2007 | Shah-Heydari |
| 7,236,987 B1 | 6/2007 | Faulkner et al. |
| 7,240,188 B2 | 7/2007 | Takata et al. |
| 7,275,157 B2 | 9/2007 | Cam Winget |
| 7,366,114 B2 | 4/2008 | Park et al. |
| 7,440,735 B2 | 10/2008 | Karschnia et al. |
| 7,460,865 B2 | 12/2008 | Nixon et al. |
| 7,620,409 B2 | 11/2009 | Budampati et al. |
| 7,688,802 B2 | 3/2010 | Gonia et al. |
| 7,802,016 B2 | 9/2010 | Eimers-Klose et al. |
| 8,108,853 B2 | 1/2012 | Bale et al. |
| 8,498,201 B2 | 7/2013 | Budampati et al. |
| 8,756,412 B2 | 6/2014 | Pulini et al. |
| 2002/0072329 A1 | 6/2002 | Bandeira et al. |
| 2002/0120671 A1 | 8/2002 | Daffner et al. |
| 2002/0122230 A1 | 9/2002 | Izadpanah et al. |
| 2002/0176396 A1 | 11/2002 | Hammel et al. |
| 2003/0003912 A1 | 1/2003 | Melpignano et al. |
| 2003/0005149 A1 | 1/2003 | Haas et al. |
| 2003/0177150 A1 | 9/2003 | Fung et al. |
| 2003/0212768 A1 | 11/2003 | Sullivan |
| 2004/0010694 A1 | 1/2004 | Collens et al. |
| 2004/0028023 A1 | 2/2004 | Mandhyan et al. |
| 2004/0029553 A1 | 2/2004 | Cain |
| 2004/0083833 A1 | 5/2004 | Hitt et al. |
| 2004/0174829 A1 | 9/2004 | Ayyagari |
| 2004/0230899 A1 | 11/2004 | Pagnano et al. |
| 2004/0259533 A1 | 12/2004 | Nixon et al. |
| 2005/0059379 A1 | 3/2005 | Sovio et al. |
| 2005/0071708 A1 | 3/2005 | Bartfai et al. |
| 2005/0102562 A1 | 5/2005 | Shinohara et al. |
| 2005/0141553 A1 | 6/2005 | Kim et al. |
| 2005/0201349 A1 | 9/2005 | Budampati |
| 2005/0228509 A1 | 10/2005 | James |
| 2005/0254653 A1 | 11/2005 | Potashnik et al. |
| 2005/0281215 A1 | 12/2005 | Budampati et al. |
| 2005/0289553 A1 | 12/2005 | Miki |
| 2006/0002368 A1 | 1/2006 | Budampati et al. |
| 2006/0015641 A1 | 1/2006 | Ocko et al. |
| 2006/0039347 A1 | 2/2006 | Nakamura et al. |
| 2006/0083200 A1 | 4/2006 | Emeott et al. |
| 2006/0104301 A1 | 5/2006 | Beyer et al. |
| 2006/0128349 A1 | 6/2006 | Yoon |
| 2006/0171344 A1 | 8/2006 | Subramanian et al. |
| 2006/0171346 A1 | 8/2006 | Kolavennu et al. |
| 2006/0227729 A1 | 10/2006 | Budampati et al. |
| 2006/0256740 A1 | 11/2006 | Koski |
| 2006/0271814 A1 | 11/2006 | Fung et al. |
| 2006/0274644 A1 | 12/2006 | Budampati et al. |
| 2006/0274671 A1 | 12/2006 | Budampati et al. |
| 2006/0282498 A1 | 12/2006 | Muro |
| 2006/0287001 A1 | 12/2006 | Budampati et al. |
| 2007/0022317 A1 | 1/2007 | Chen et al. |
| 2007/0030816 A1 | 2/2007 | Kolavennu |
| 2007/0030832 A1 | 2/2007 | Gonia et al. |
| 2007/0067458 A1 | 3/2007 | Chand |
| 2007/0073861 A1 | 3/2007 | Amanuddin et al. |
| 2007/0076638 A1 | 4/2007 | Kore et al. |
| 2007/0077941 A1 | 4/2007 | Gonia et al. |
| 2007/0087763 A1 | 4/2007 | Budampati et al. |
| 2007/0091824 A1 | 4/2007 | Budampati et al. |
| 2007/0091825 A1 | 4/2007 | Budampati et al. |
| 2007/0103303 A1 | 5/2007 | Shoarinejad |
| 2007/0147294 A1 | 6/2007 | Bose et al. |
| 2007/0153677 A1 | 7/2007 | McLaughlin et al. |
| 2007/0153789 A1 | 7/2007 | Barker, Jr. et al. |
| 2007/0155423 A1 | 7/2007 | Carmody et al. |
| 2007/0237137 A1 | 10/2007 | McLaughlin |
| 2007/0261052 A1 | 11/2007 | Bale et al. |
| 2007/0280178 A1 | 12/2007 | Hodson et al. |
| 2008/0043637 A1 | 2/2008 | Rahman |
| 2008/0134164 A1 | 6/2008 | Stich et al. |
| 2008/0140844 A1 | 6/2008 | Halpern |
| 2008/0267259 A1 | 10/2008 | Budampati et al. |
| 2008/0273547 A1 | 11/2008 | Phinney |
| 2009/0022121 A1 | 1/2009 | Budampati et al. |
| 2009/0034441 A1 | 2/2009 | Budampati et al. |
| 2009/0060192 A1 | 3/2009 | Budampati et al. |
| 2009/0086692 A1 | 4/2009 | Chen |
| 2009/0109889 A1 | 4/2009 | Budampati et al. |
| 2009/0138541 A1 | 5/2009 | Wing et al. |
| 2009/0222466 A1* | 9/2009 | Allison ............ G06F 11/2002 |
| 2010/0042869 A1 | 2/2010 | Szabo et al. |
| 2010/0128699 A1 | 5/2010 | Yang et al. |
| 2010/0287548 A1 | 11/2010 | Zhou et al. |
| 2011/0305206 A1 | 12/2011 | Junell et al. |
| 2012/0017031 A1 | 1/2012 | Mashtizadeh et al. |
| 2012/0101663 A1 | 4/2012 | Fervel et al. |
| 2012/0117416 A1 | 5/2012 | McLaughlin |
| 2013/0219161 A1 | 8/2013 | Fontignie et al. |
| 2015/0066163 A1 | 3/2015 | Sunderam |

FOREIGN PATENT DOCUMENTS

| | | |
|---|---|---|
| DE | 4134207 C1 | 4/1993 |
| DE | 103 14 721 A1 | 11/2004 |
| EP | 1 081 895 A1 | 3/2001 |
| EP | 1 401 171 A2 | 3/2004 |
| EP | 1 439 667 A2 | 7/2004 |
| GB | 2 427 329 A | 12/2006 |
| WO | WO 00/77585 A1 | 12/2000 |
| WO | WO 01/35190 A2 | 5/2001 |
| WO | WO 03/079616 A1 | 9/2003 |
| WO | WO 2004/047385 A2 | 6/2004 |
| WO | WO 2004/114621 A1 | 12/2004 |
| WO | WO 2006/017994 A1 | 2/2006 |
| WO | WO 2006/053041 A1 | 5/2006 |
| WO | WO 2012/131074 A1 | 10/2012 |

OTHER PUBLICATIONS

Salman Taherian, et al., "Event Dissemination in Mobile Wireless Sensor Networks", 2004 IEEE International Conference on Mobile Ad-Hoc and Sensor Systems, p. 573-575.

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Dr. Soumitri Kolavennu, Presentation, "WNSIA MAC Layer", ISA SP100 meeting, Feb. 14, 2007, 24 pages, see esp. p. 17.

Ying Zhang, et al., "A Learning-based Adaptive Routing Tree for Wireless Sensor Networks", Journal of Communications, vol. 1, No. 2, May 2006, p. 12-21.

Yau-Ming Sun, et al., "An Efficient Deadlock-Free Tree-Based Routing Algorithm for Irregular Wormhole-Routed Networks Based on the Turn Model", Proceedings of the 2004 International Conference on Parallel Processing (ICPP'04), 10 pages.

(56) References Cited

OTHER PUBLICATIONS

Sejun Song, "Fault Recovery Port-based Fast Spanning Tree Algorithm (FRP-FAST) for the Fault-Tolerant Ethernet on the Arbitrary Switched Network Topology", 2001 IEEE, p. 325-332.
"XYR 5000 Wireless Transmitters, Honeywell Solutions for Wireless Data Acquisiton and Monitoring," www.acs.honeywell.com, Feb. 2006, 6 pages.
Communication pursuant to Article 94(3) EPC dated Apr. 2, 2009 in connection with European Patent Application No. 07 761 784.3, 9 pgs.
A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.
International Search Report and Written Opinion of the International Searching Authority in PCT Application No. PCT/US2007/069717 dated Dec. 10, 2007, 10 pgs.
International Search Report and Written Opinion of the International Searching Authority in PCT Application No. PCT/US2007/069614 dated Nov. 22, 2007, 9 pgs.
International Search Report and Written Opinion of the International Searching Authority in PCT Application No. PCT/US2007/069710 dated Nov. 27, 2007, 10 pgs.
International Search Report and Written Opinion of the International Searching Authority in PCT Application No. PCT/US2007/069705 dated Apr. 15, 2008, 9 pgs.
Pereira, J.M. Dias, "A Fieldbus Prototype for Educational Purposes", IEEE Instrumentation & Measurement Magazine, New York, NY vol. 7, No. 1, Mar. 2004, p. 24-31.
International Search Report and Written Opinion of the International Searching Authority in PCT Application No. PCT/US2006/048334 dated Jul. 5, 2007, 10 pgs.
European Search Report dated Oct. 6, 2008 in connection with European Patent Application No. 08 16 1387.9, 3 pgs.
Strilich, et al.; "Gateway Offering Logical Model Mapped to Independent Underlying Networks"; U.S. Appl. No. 14/269,903, filed May 5, 2014; 49 pages.
David E. Lowell, et al., "Devirtualizable Virtual Machines Enabling General, Single-Node, Online Maintenance", ASPLOS'04, Oct. 9-13, 2004, p. 211-223.
Olivier Crameri, et al., "Staged Deployment in Mirage, an Integrated Software Upgrade Testing and Distribution System", SOSP'07, Oct. 14-17, 2007, 16 pages.
Ramakrishna S. Budampati, et al., "Apparatus and Method for Improving the Reliability of Industrial Wireless Networks That Experience Outages in Backbone Connectivity", U.S. Appl. No. 12/869,557, filed Aug. 26, 2010, 27 pgs.
Christopher Pulini, et al. "Gateway Supporting Transparent Redundancy in Process Control Systems and Other Systems and Related Method", U.S. Appl. No. 12/762,215, filed Apr. 16, 2010, 56 pgs.
Paul F. McLaughlin et al., "On-Process Migration From One Type of "Level 1" Process Controller to a Different Type of "Level 1" Process Controller", U.S. Appl. No. 62/145,371, filed Apr. 9, 2015, 22 pgs.
John M. Prall et al., "Apparatus and Method for On-Process Migration of Industrial Control and Automation System Across Disparate Network Types", U.S. Appl. No. 14/476,355, filed Sep. 3, 2014, 39 pgs.
Prakash Mani et al., "Method and Apparatus for an On-Process Migration in a Virtual Environment Within an Industrial Process Control and Automation System", U.S. Appl. No. 14/871,898, filed Sep. 30, 2015, 45 pgs.
Paul F. McLaughlin, Method and System for Process Control Network Migration, U.S. Appl. No. 12/942,177, filed Nov. 9, 2010, 39 pgs.

* cited by examiner

METHOD AND SYSTEM FOR DISTRIBUTED CONTROL SYSTEM (DCS) PROCESS DATA CLONING AND MIGRATION THROUGH SECURED FILE SYSTEM

TECHNICAL FIELD

This disclosure relates generally to industrial process control and automation systems. More specifically, this disclosure relates to a method and apparatus for distributed control system (DCS) process data cloning and migration through a secured file system.

BACKGROUND

Industrial process control and automation systems, including distributed control systems (DCSs), are often used to automate large and complex industrial processes. These types of systems routinely include sensors, actuators, and controllers. The controllers typically receive measurements from the sensors and generate control signals for the actuators.

Many existing DCS systems are platform- and release-dependent. That is, these DCS systems are based on plant processes that can be replicated based on process and instrumentation requirements. Many existing DCS migration processes are release- and operating system-dependent, while the associated customer control system strategies and displays are release- and platform-independent such that they can be deployed in any system across multiple releases. Typically, any migration involves activities such as backup of system configurations, installation of software/firmware, and restoration of system configurations with the new software/firmware. These operations are repeated for each node of a DCS system, which consumes a significant amount of time. Currently, there is no adequate mechanism to provide a deployable and recreatable file structure that is independent of platform and release for rapid DCS system deployment.

In addition, existing approaches are not capable of making use of effective sharing models such as cloud-based, web-based, or virtual networking models. Many nodes in secured networks may not have any access or connectivity to external networks, such as the Internet. In some instances, even if a node has connectivity to one or more external networks, security settings may prevent sharing migration data with an external network.

SUMMARY

This disclosure provides a method and apparatus for distributed control system (DCS) process data cloning and migration through a secured file system.

In a first embodiment, a method includes generating a migration image file for a software migration based on configuration parameters associated with a first node of an industrial process control and automation system. The method also includes, after a new software version is installed at the first node, restoring information associated with the first node using the migration image file. The method further includes adapting a portion of the migration image file based on configuration parameters associated with a second node of the control and automation system. In addition, the method includes, after the new software version is installed at the second node, restoring information associated with the second node using the adapted migration image file.

In a second embodiment, an apparatus includes at least one processing device configured to generate a migration image file for a software migration based on configuration parameters associated with a first node of an industrial process control and automation system. The at least one processing device is also configured to, after a new software version is installed at the first node, restore information associated with the first node using the migration image file. The at least one processing device is further configured to adapt a portion of the migration image file based on configuration parameters associated with a second node of the control and automation system. In addition, the at least one processing device is configured to, after the new software version is installed at the second node, restore information associated with the second node using the adapted migration image file.

In a third embodiment, a non-transitory computer readable medium embodies a computer program. The computer program includes computer readable program code for generating a migration image file for a software migration based on configuration parameters associated with a first node of an industrial process control and automation system. The computer program also includes computer readable program code for, after a new software version is installed at the first node, restoring information associated with the first node using the migration image file. The computer program further includes computer readable program code for adapting a portion of the migration image file based on configuration parameters associated with a second node of the control and automation system. In addition, the computer program includes computer readable program code for, after the new software version is installed at the second node, restoring information associated with the second node using the adapted migration image file.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
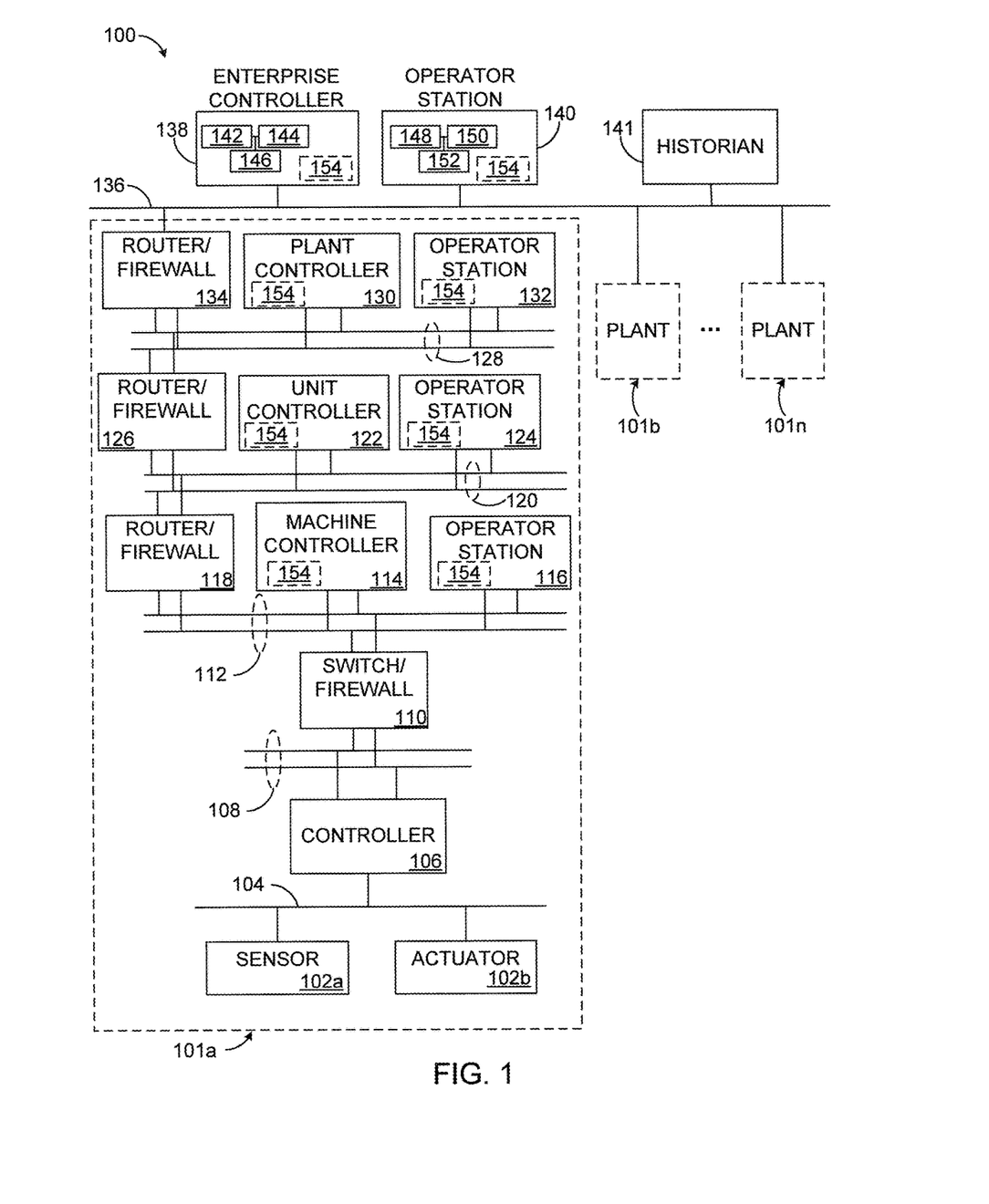
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one to product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as an EXPERION C300 controller by HONEYWELL INTERNATIONAL INC. As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

In some embodiments, the system 100 may represent all or portions of a distributed control system (DCS), and the various controllers and operator stations in FIG. 1 may represents nodes within the DCS. Over time, software or firmware used to control or perform various operations of each controller or operator station may need to be updated or migrated to a new or different version. In many systems, multiple nodes are updated together as part of a single migration process. In larger systems, a migration to new versions of system software or firmware can take substantial amounts of time and introduce migration issues that need to be overcome.

Figure 2:
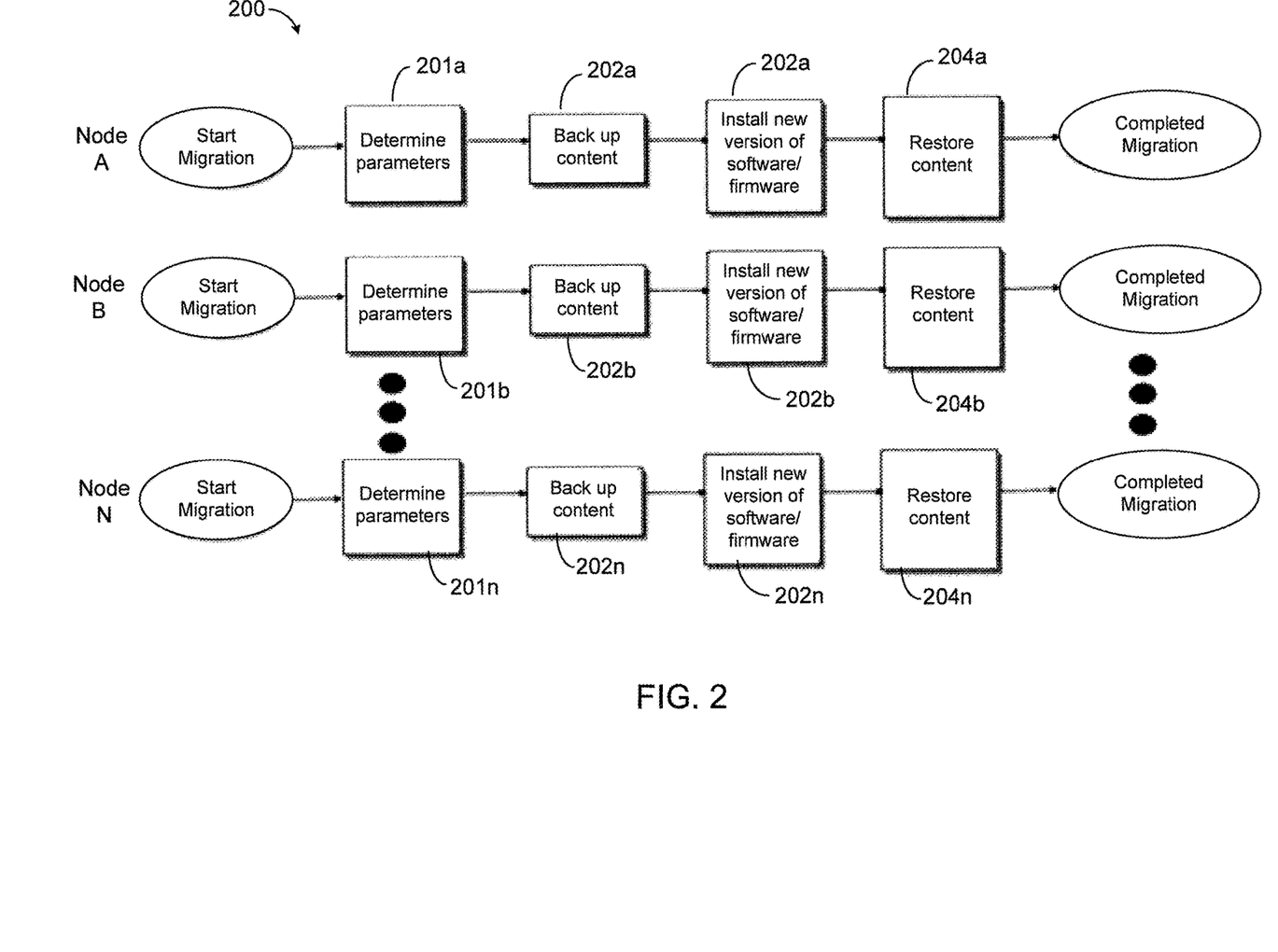
FIG. 2 illustrates an example migration process for multiple nodes in a distributed control system (DCS)

FIG. 2 illustrates an example migration process 200 for multiple nodes in a DCS. The DCS could denote all or part of the system 100 of FIG. 1. As shown in FIG. 2, the multiple nodes include Nodes A through N. Depending on the embodiment, the nodes may represent devices in a single cluster within the DCS or devices across multiple clusters within the DCS. Each node could represent a computing device, such as a process controller, operator station, or a client device or server device in a client/server arrangement of components. Each node could represent any other suitable device in a DCS. In some embodiments, one or more of the nodes can be used for monitoring operations in the DCS.

The migration of each node includes multiple operations that are performed sequentially for each node. For Node A, operations 201a-204a are performed in sequence. Operation 201a involves determining a set of parameters associated with the configuration of Node A. The complete set of parameters can differ somewhat from node to node. However, most nodes include a common set of parameters, such as machine name, IP address, registry path, and the like. Operation 202a represents a backup operation in which content associated with Node A is saved or copied to a backup storage location. The content can include the parameters determined in operation 201a. The backup storage location could include an existing memory, database, or other suitable data storage, or the backup storage location could include a backup storage that is configured specifically for the migration process. Operation 203a involves installing a new version of software or firmware for Node A. This may include one or more installation operations performed by a user, one or more automated installation operations performed by a processing device, or a combination thereof. Operation 204a involves restoring the backed-up content in a manner that makes the content compatible with the new version of software or firmware. This may include executing one or more data migration scripts or processes to convert the backed-up content to be compatible with the new version of software or firmware.

Operations 201a-204a are performed sequentially for the migration of Node A. Operations analogous to the operations 201a-204a are also performed for each of the other nodes. For example, operations 201b-204b are performed for Node B, and operations 201n-204n are performed for Node N. Thus, it can be seen from FIG. 2 that the total time to migrate N nodes is equal to the sum of the times for operations 201a-201n, the times for operations 202a-202n, the times for operations 203a-203n, and the times for operations 204a-204n. When the number of nodes is large, the total migration time can be significant. Any opportunities to reduce the complexity, time, and number of steps involved in a migration is worth examining.

Returning to FIG. 1, in accordance with this disclosure, one or more components of the system 100 support the use of a platform- and release-independent migration (PIM) tool 154 for DCS backup and restore operations. The PIM tool 154 can be deployed easily during migration of software or firmware associated with DCS components. In some embodiments, the PIM tool 154 can include or use a proprietary or standardized file structure in an easily re-deployable format that is utilized for migration deployment and that supports multiple types of databases, human-machine interfaces (HMIs), controllers, instrumentation, and file systems. For example, the PIM tool 154 can support migrations of multiple nodes across multiple HONEYWELL EXPERION clusters. Some migrations also include hardware migrations in which one or more hardware components are replaced with new or different hardware components. While some references to migration in this patent document may only explicitly describe software migration for ease of explanation, it will be understood that such references can also or alternatively refer to firmware migrations where applicable, and hardware migrations may or may not be involved in a software or firmware migration.

The PIM tool 154 includes any suitable structure supporting data cloning and migration operations for use with devices in an industrial process control and automation system. The PIM tool 154 could, for example, represent a computing device having at least one processor, at least one memory, and at least one network interface. The PIM tool 154 could represent a stand-alone component (such as a computing device designated solely for this purpose) or be integrated into another component (such as a computing device implementing control functionality on some level of the system 100). The logic of the PIM tool 154 could be implemented using hardware components only or using hardware components and software/firmware instructions. Additional details regarding specific implementations of the PIM tool 154 are provided below.

Although FIG. 1 illustrates one example of an industrial process control and automation system 100, various changes may be made to FIG. 1. For example, a control system could include any number of sensors, actuators, controllers, servers, operator stations, networks, and PIM tools. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, FIG. 1 illustrates an example environment in which process data cloning can be used for migration of components in a DCS. This functionality can be used in any other suitable device or system.

Figure 3:
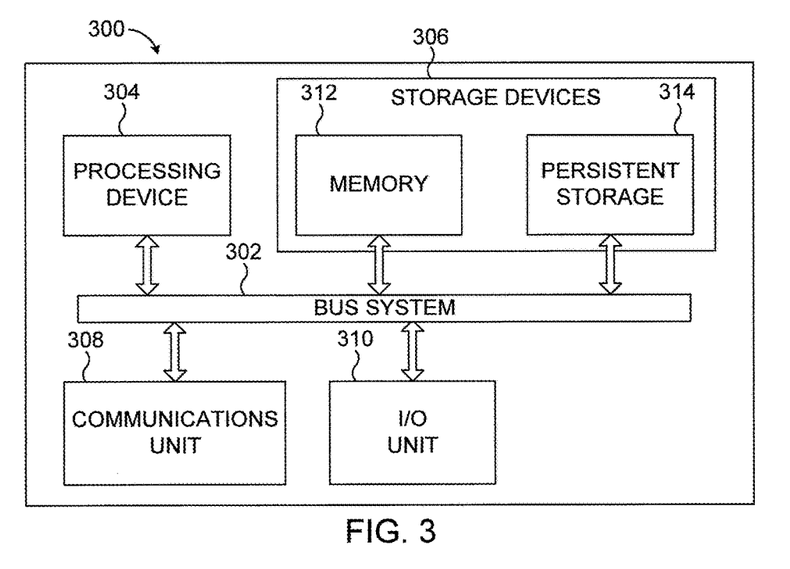
FIG. 3 illustrates an example device for DCS process data cloning and migration according to this disclosure.

FIG. 3 illustrates an example device 300 for DCS process data cloning and migration according to this disclosure. The device 300 could, for example, represent any suitable device in the system 100 of FIG. 1 that provides the PIM tool 154.

As shown in FIG. 3, the device 300 includes a bus system 302, which supports communication between at least one processing device 304, at least one storage device 306, at least one communications unit 308, and at least one input/output (I/O) unit 310. The processing device 304 executes instructions that may be loaded into a memory 312. The processing device 304 may include any suitable number(s) and type(s) of processors or other devices in any suitable arrangement. Example types of processing devices 304 include microprocessors, microcontrollers, digital signal processors, field programmable gate arrays, application specific integrated circuits, and discrete circuitry.

The memory 312 and a persistent storage 314 are examples of storage devices 306, which represent any structure(s) capable of storing and facilitating retrieval of information (such as data, program code, and/or other suitable information on a temporary or permanent basis). The memory 312 may represent a random access memory or any other suitable volatile or non-volatile storage device(s). The persistent storage 314 may contain one or more components or devices supporting longer-term storage of data, such as a ready only memory, hard drive, Flash memory, or optical disc.

The communications unit 308 supports communications with other systems or devices. For example, the communications unit 308 could include a network interface card that facilitates communications over at least one Ethernet network. The communications unit 308 could also include a wireless transceiver facilitating communications over at least one wireless network. The communications unit 308 may support communications through any suitable physical or wireless communication link(s).

The I/O unit 310 allows for input and output of data. For example, the I/O unit 310 may provide a connection for user input through a keyboard, mouse, keypad, touchscreen, or other suitable input device. The I/O unit 310 may also send output to a display, printer, or other suitable output device.

Although FIG. 3 illustrates one example of a device 300 for DCS process data cloning and migration, various changes may be made to FIG. 3. For example, various components in FIG. 3 could be combined, further subdivided, or omitted and additional components could be added according to particular needs. Also, computing devices can come in a wide variety of configurations, and FIG. 3 does not limit this disclosure to any particular configuration of computing device.

Figure 4:
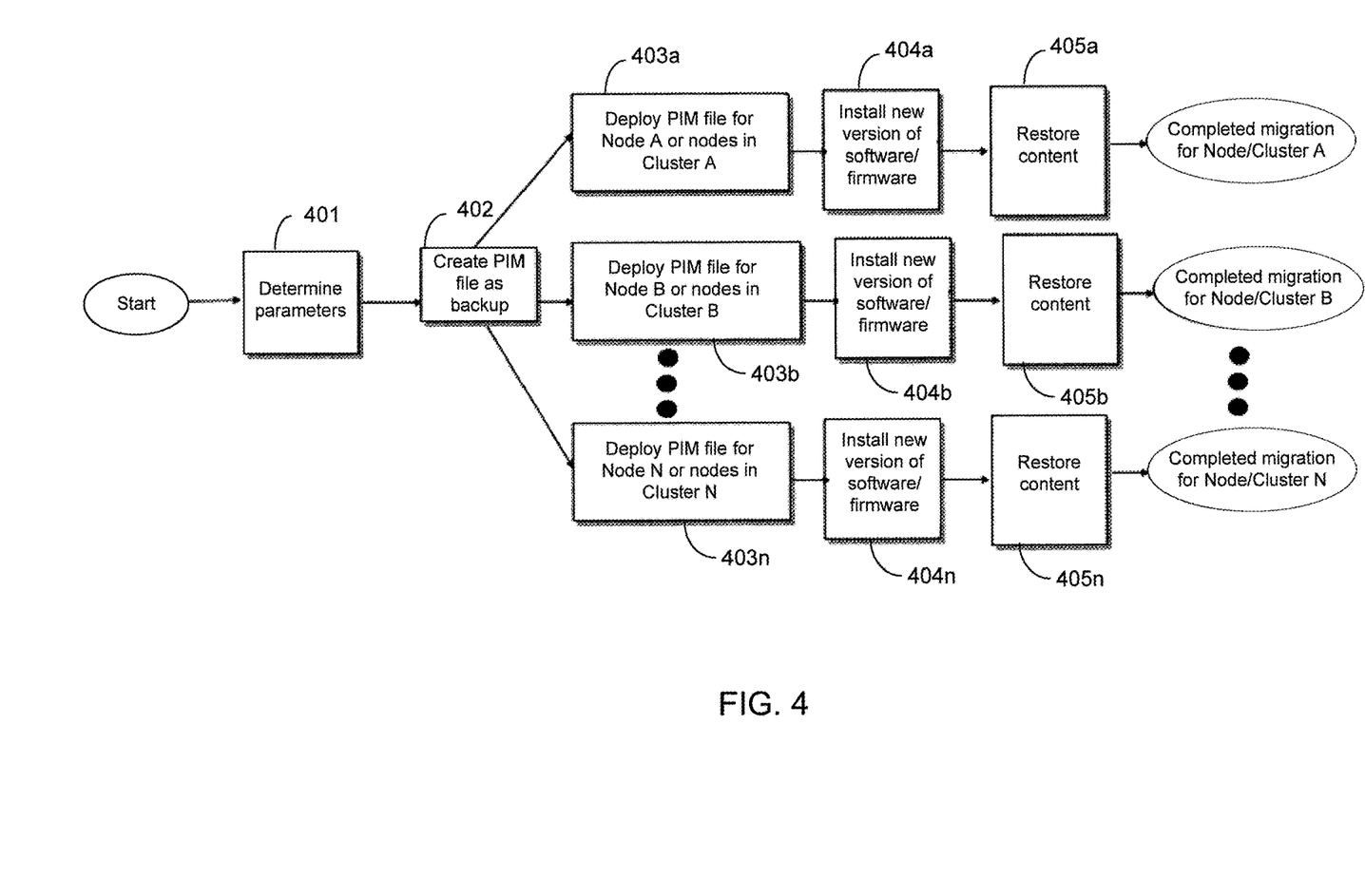
FIG. 4 illustrates example operations of a platform- and release-independent migration (PIM) tool for DCS process data cloning and migration according to this disclosure.

FIG. 4 illustrates example operations of a PIM tool 154 for DCS process data cloning and migration according to this disclosure. For ease of explanation, the PIM tool 154 is described as being used in the system 100 of FIG. 1 to alter the migration process 200 shown in FIG. 2. However, the PIM tool 154 could be used in any other suitable system and could support any other suitable migration process.

To summarize the operations shown in FIG. 4, migration operations are performed one time for a first node (Node A) or a first cluster of similar nodes (Cluster A). Once the migration is successfully completed for Node A or Cluster A, a backup data file used during the migration of that node/cluster can be customized and used for the migration of additional nodes or clusters. Thus, a backup operation is performed only once, and the backup data file is cloned by creating a clone image of the data in the file. The clone image is modified as needed and used during the migration of the additional nodes or clusters, where only installation of software and restoral of the backup content is performed. This can result in significant reductions in the time needed to complete a migration.

Customization of a backup data file allows for use of the backup data file across different nodes/clusters with different configurations. For example, some parameters are consistent across nodes in a cluster, while other parameters differ between nodes. As particular examples, the Internet Protocol (IP) or other network address and machine name may be different for each node. Thus, customization can be used to change the network address and machine name in cloned backup data for each node.

It is assumed for the example shown in FIG. 4 that a software migration is scheduled for multiple nodes in a DCS. The migration is from an earlier software release (denoted "n-x") to an updated or newer release (denoted "n").

As shown in FIG. 4, after the PIM tool 154 is launched, the PIM tool 154 determines a list of configuration parameters at operation 401, and the PIM tool 154 could present the configuration parameters to a user on a display of an operator station or other device. In some embodiments, the configuration parameters are divided into two categories: variable parameters and consistent parameters. Variable parameters denote parameters that may be different for each migrated node. Example variable parameters may include machine names, IP/network addresses, FAULT TOLERANT ETHERNET (FTE) details, FTE base IP/network addresses, subnet masks, platform details, EXPERION MIGRATION STORAGE NODE (EMSN) paths, install paths, Universal Naming Convention (UNC) paths, EXPERION SOFTWARE INSTALLATION SERVER (ESIS) paths, control system details (such as process equipment details), and encrypted passwords. Consistent parameters are parameters whose values are the same across the different nodes. Example consistent parameters may include registry paths and base IP/network addresses. Of course, these are merely some examples of possible variable and consistent parameters, and other embodiments may include additional or different parameters. As part of this operation, the PIM tool 154 captures desired configuration data (including both the variable parameters and the consistent parameters) for the migration of Node A or nodes in Cluster A and can prompt the user to enter or update each variable parameter for Node A or the nodes in Cluster A. In some embodiments, to reduce data entry efforts, the PIM tool 154 may provide a default value for a variable parameter (such as the value associated with the previous node or a commonly occurring value) and allow the user to accept or override the default value. The user can enter information as needed to update the values of the variable parameters, such as by entering a value for the machine name, IP/network address, and the like.

At operation 402, the PIM tool 154 creates a PIM file as a backup of Node A or the nodes in Cluster A. In some embodiments, the PIM file includes a secured data set that is proprietary to the migration provider, although a standardized or non-proprietary data set could also be supported. The PIM tool 154 creates the PIM file using the variable and consistent parameters of Node A/Cluster A described above. With minimal or no customization, the PIM file is capable of being deployed irrespective of platform, release, and cluster across geographical locations.

At operation 403a, the PIM tool 154 ensures that any prerequisites are met for the migration of Node A or the nodes of Cluster A, and the PIM file is deployed in preparation for the migration of Node A or the nodes of Cluster A. At operation 404a, a new version of software is installed for Node A or the nodes of Cluster A. This may include one or more installation operations performed by a user, one or more automated installation operations performed by a processing device, or a combination thereof. At operation 405a, the backed-up content from the PIM file is restored in a manner that makes the content compatible with the new version of the software. This may include executing one or more data migration scripts or processes to convert the backed-up content to be compatible with the new version of software. At this point, Node A or the nodes of Cluster A have been successfully migrated to the new software.

To migrate an additional node or cluster (such as node/cluster B through N), no backup of the nodes or clusters may be needed. Instead, the PIM file generated earlier is cloned, updated with information specified to the additional node or cluster, and deployed to the additional node or cluster. The cloned and modified PIM file is then used to migrate the additional node or cluster. For example, with respect to Node B or the nodes in Cluster B, a cloned PIM file is presented to the user at operation 403b, and the user can update one or more of the variable parameters for Node B or the nodes in Cluster B as described above. The updated values are saved in the cloned PIM file, and consistent parameters do not need to be updated for Node B or the nodes in Cluster B. The PIM file's content can be reviewed, validated, and verified for any migration anomalies (such as encryption/decryption errors) before it is deployed, and the PIM file is deployed in preparation for the migration of Node B or the nodes in Cluster B. The new version of the software is installed for Node B or the nodes in Cluster B at operation 404*b*, and the backed-up content for Node B or the nodes in Cluster B is restored at operation 405*b*. Similar operations can be performed for each remaining node or cluster, such as operations 403*n*-405*n* for Node N or the nodes in Cluster N.

As can be seen from FIG. 4, the total time for the migration can be significantly reduced. Here, the total time for the migration can be calculated as the sum of (i) the time needed to generate a single PIM file and (ii) N×[time for PIM file deployment+time for software installation+time for restoral of data].

In some embodiments, the number of consistent parameters (which are the same between multiple nodes being migrated) can be substantially larger than the number of variable parameters (which can be different from node to node). Thus, significant time savings can be realized by using the same cloned data for each node migration and only customizing the variable data for each node. Hence, this migration approach provides a shorter and more effective upgrade migration compared to existing migration strategies.

As a descriptive example, consider a production plant that includes multiple fluid tracking processes in the petroleum industry. In the production plant, two tracking units have the same (or substantially the same) production process. Accordingly, the control systems that control these two tracking units can be the same. In some embodiments, only the names of the two tracking units may be different. Since the controls and processes for the two tracking units are the same and only the names are different, substantial portions of the data associated with each tracking unit can be reused during a migration. For example, it may be possible to reuse all of the data except for the name of each tracking unit. This concept of reusability of data can be scaled up for larger plant systems. For instance, instead of two tracking units in a single plant, backed-up data could be used and reused across multiple plants in multiple geographical locations. This can be useful for companies that have multiple plants or plant locations across different geographical locations, including different countries.

Although FIG. 4 illustrates one example of operations of a PIM tool 154 for DCS process data cloning and migration, various changes may be made to FIG. 4. For example, various operations shown in FIG. 4 could overlap, occur in parallel, occur in a different order, or occur multiple times. Moreover, some operations could be combined or removed and additional operations could be added according to particular needs.

Figure 5:
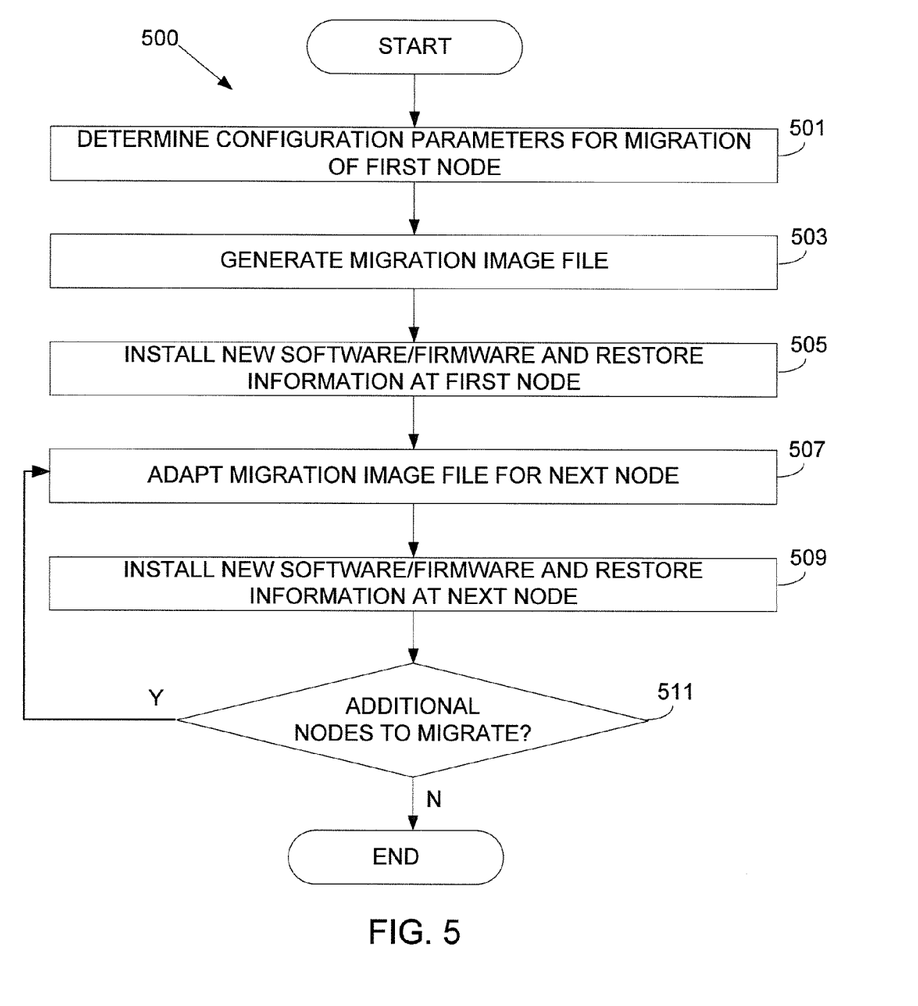
FIG. 5 illustrates an example method for DCS process data cloning and migration according to this disclosure.

FIG. 5 illustrates an example method 500 for DCS process data cloning and migration according to this disclosure. For ease of explanation, the method 500 is described as being performed by the PIM tool 154 in the system 100 of FIG. 1. However, the method 500 could be used with any suitable device or system.

At step 501, one or more configuration parameters associated with a first node of an industrial process control and automation system are determined for a migration image file. This may include, for example, the PIM tool 154 determining the configuration parameters of a controller, operator station, client, server, or other node. At step 503, the migration image file is generated based on the configuration parameters. This may include, for example, the PIM tool 154 creating a PIM file as a backup of the first node. The migration image file includes variable parameters that may differ between nodes involved in a migration and consistent parameters that are the same for the nodes involved in the migration.

At step 505, a new software version is installed at the first node, and information associated with the first node is restored using the migration image file. This may include, for example, the PIM tool 154 executing one or more data migration scripts or processes to convert the backed-up content to be compatible with the new version of the software.

At step 507, a portion of the migration image file is adapted based on configuration parameters associated with a second node of the industrial process control and automation system. This may include, for example, the PIM tool 154 displaying the variable parameters of the second node on a display and receiving an indication of a change to one or more of the variable parameters from a user.

At step 509, the new software version is installed at the second node, and information associated with the second node is restored using the adapted migration image file. This may include, for example, the PIM tool 154 executing one or more data migration scripts or processes to convert the backed-up content to be compatible with the new version of software.

At step 511, a determination is made whether any additional nodes are to be migrated in the migration process. If so, the method 500 returns to step 507, and the iterations may be repeated for each node involved in the software migration. Otherwise, the method 500 ends.

Although FIG. 5 illustrates one example of a method 500 for DCS process data cloning and migration, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs. In addition, while described as migrating a single node during step 505 and during each iteration of step 509, the method 500 could be modified to migrate clusters of nodes during step 505 and during each iteration of step 509.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
generating via a platform- and release-independent (PIM) migration tool a PIM migration image file for a software migration based on configuration parameters associated with a first node among a plurality of nodes of an industrial process control and automation system, the configuration parameters comprising one or more variable parameters that differ between the plurality of nodes and one or more consistent parameters that are common among the plurality of nodes, the one or more variable parameters comprising one or more variables associated with process equipment in the industrial process control and the automation system;
after a new software version is installed at the first node, restoring information associated with the first node using the migration image file;
adapting a portion of the migration image file for a second node among the plurality of nodes of the control and automation system by cloning the PIM file generated earlier and displaying the one or more variable parameters, receiving information identifying a value of or a change to each variable parameter in the cloned PIM file for the second node, and updating the one or more variable parameters saved in said cloned PIM file for the second node according to the received information, wherein the consistent parameters do not need to be updated for said second node; and
after the new software version is installed at the second node, restoring information associated with the second node using the adapted migration image file.

2. The method of claim 1, further comprising:
repeating the adapting for one or more additional nodes among the plurality of nodes; and
for each additional node, after the new software version is installed at the additional node, restoring information associated with the additional node using the adapted migration image file associated with the additional node.

3. The method of claim 1, further comprising:
determining the configuration parameters for the migration image file.

4. The method of claim 1, wherein no backup of the second node is performed during the software migration.

5. The method of claim 1, wherein:
the migration image file is based on configuration parameters associated with a first cluster of nodes, the first cluster of nodes including the first node;
after the new software version is installed at the first cluster of nodes, information associated with the first cluster of nodes is restored using the migration image file;
the portion of the migration image file is adapted based on configuration parameters associated with a second cluster of nodes, the second cluster of nodes including the second node; and
after the new software version is installed at the second cluster of nodes, information associated with the second cluster of nodes is restored using the adapted migration image file.

6. The method of claim 1, wherein:
the one or more variable parameters comprise at least one of: a machine name, a network address, a subnet mask, an install path, a Universal Naming Convention (UNC) path, and an encrypted password; and the one or more consistent parameters comprise at least one of: a registry path and a base Internet Protocol (IP)/network address.

7. The method of claim 1, wherein at least one of the plurality of nodes comprises a process controller of a distributed control system (DCS).

8. An apparatus comprising:
at least one processing device configured to:
generate via a platform- and release-independent (PIM) migration tool a PIM migration image file for a software migration based on configuration parameters associated with a first node among a plurality of nodes of an industrial process control and automation system, the configuration parameters comprising one or more variable parameters that differ between the plurality of nodes and one or more consistent parameters that are common among the plurality of nodes, the one or more variable parameters comprising one or more variables associated with process equipment in the industrial process control and automation system;
after a new software version is installed at the first node, restore information associated with the first node using the migration image file;
adapt a portion of the migration image file for a second node among the plurality of nodes of the control and automation system by initiating cloning the PIM file generated earlier and displaying the one or more variable parameters, receiving information identifying a value of or a change to each variable parameter in the cloned PIM file for the second node, and updating the one or more variable parameters saved in said cloned PIM file for the second node according to the received information, wherein the consistent parameters do not need to be updated for said second node; and
after the new software version is installed at the second node, restore information associated with the second node using the adapted migration image file.

9. The apparatus of claim 8, wherein the at least one processing device is further configured to:
repeat the adapting for one or more additional nodes among the plurality of nodes; and for each additional node, after the new software version is installed at the additional node, restore information associated with the additional node using the adapted migration image file associated with the additional node.

10. The apparatus of claim 8, wherein the at least one processing device is further configured to determine the configuration parameters for the migration image file.

11. The apparatus of claim 8, wherein the at least one processing device is configured to perform no backup of the second node during the software migration.

12. The apparatus of claim 8, wherein:
the at least one processing device is configured to generate the migration image file based on configuration parameters associated with a first cluster of nodes, the first cluster of nodes including the first node;
the at least one processing device is configured, after the new software version is installed at the first cluster of nodes, to restore information associated with the first cluster of nodes using the migration image file;
the at least one processing device is configured to adapt the portion of the migration image file based on configuration parameters associated with a second cluster of nodes, the second cluster of nodes including the second node; and
the at least one processing device is configured, after the new software version is installed at the second cluster of nodes, to restore information associated with the second cluster of nodes using the adapted migration image file.

13. The apparatus of claim 8, wherein:
the one or more variable parameters comprise at least one of: a machine name, a network address, a subnet mask, an install path, a Universal Naming Convention (UNC) path, and an encrypted password; and the one or more consistent parameters comprise at least one of: a registry path and a base Internet Protocol (IP)/network address.

14. The apparatus of claim 8, wherein at least one of the plurality of nodes comprises a process controller of a distributed control system (DCS).

15. A non-transitory computer readable medium embodying a computer program, the computer program comprising instructions that when executed cause at least one processor to:
generate via a platform- and release-independent (PIM) migration tool a PIM migration image file for a software migration based on configuration parameters associated with a first node among a plurality of nodes of an industrial process control and automation system, the configuration parameters comprising one or more variable parameters that differ between the plurality of nodes and one or more consistent parameters that are common among the plurality of nodes, the one or more variable parameters comprising one or more variables associated with process equipment in the industrial process control and automation system;
after a new software version is installed at the first node, restoring information associated with the first node using the migration image file;
adapting a portion of the migration image file for based on configuration parameters associated with a second node among the plurality of nodes of the control and automation system by using the cloned PIM file generated earlier and displaying the one or more variable parameters, receiving information identifying a value of or a change to each variable parameter in the cloned PIM file for the second node, and updating the one or more variable parameters saved in said cloned PIM file for the second node according to the received information, wherein the consistent parameters do not need to be updated for said second node; and
after the new software version is installed at the second node, restoring information associated with the second node using the adapted migration image file.

16. The non-transitory computer readable medium of claim 15, wherein the computer program further comprises computer readable program code for:
repeating the adapting for one or more additional nodes; and
for each additional node, after the new software version is installed at the additional node, restoring information associated with the additional node using the adapted migration image file associated with the additional node.

17. The non-transitory computer readable medium of claim 15, wherein the computer program further comprises computer readable program code for:
determining the configuration parameters for the migration image file.

18. The non-transitory computer readable medium of claim 15, wherein the computer program is configured to perform no backup of the second node during the software migration.

19. The non-transitory computer readable medium of claim 15, wherein:
the one or more variable parameters comprise at least one of: a machine name, a network address, a subnet mask, an install path, a Universal Naming Convention (UNC) path, and an encrypted password; and the one or more consistent parameters comprise at least one of: a registry path and a base Internet Protocol (IP)/network address.

20. The non-transitory computer readable medium of claim 15, wherein at least one of the plurality of nodes comprises a process controller of a distributed control system (DCS).

* * * * *